United States Patent [19]

Zabik et al.

[11] 4,277,153
[45] Jul. 7, 1981

[54] X-RAY MICROFILM READER

[75] Inventors: Alexander J. Zabik, West Park; Stephen G. Fisher, Rhinebeck, both of N.Y.

[73] Assignee: Medrex Ltd., West Park, N.Y.

[21] Appl. No.: 88,678

[22] Filed: Oct. 26, 1979

[51] Int. Cl.³ ............... G03B 23/08; G03B 21/10; G03B 21/28
[52] U.S. Cl. .................. 353/27 R; 350/254; 353/55; 353/58; 353/77
[58] Field of Search ............ 353/27 R, 58, 61, 55, 353/74, 77, 78; 350/254

[56] References Cited

U.S. PATENT DOCUMENTS

| 2,552,238 | 5/1951 | Turner et al. | 350/254 |
| 3,183,771 | 5/1965 | Rutkus | 353/96 |
| 3,507,561 | 4/1970 | Esmay | 350/254 |
| 3,655,279 | 4/1972 | Rathfelder | 353/27 R |
| 3,836,242 | 9/1974 | Kluver et al. | 353/27 R |
| 3,871,759 | 3/1975 | Crew | 353/27 R |
| 3,942,885 | 3/1976 | Kool | 353/27 R |
| 3,961,846 | 6/1976 | Crew | 353/27 R |
| 4,025,177 | 5/1977 | Owens et al. | 353/27 A |
| 4,067,648 | 1/1978 | Spretzer | 353/27 R |
| 4,140,377 | 2/1979 | Hoadley | 353/27 R |
| 4,165,160 | 8/1979 | Persha et al. | 353/61 |
| 4,172,657 | 10/1979 | Watanabe et al. | 353/27 R |

Primary Examiner—Steven L. Stephan
Attorney, Agent, or Firm—Sprung, Felfe, Horn, Lynch & Kramer

[57] ABSTRACT

An X-ray microfilm reader comprises a microfilm medium holder for holding same in a working position and a light source disposed below the working position which reflects light from a dichroic mirror towards the microfilm medium through a condenser. The image from the microfilm medium passes through any one of a plurality of projecting lenses and through a coner and is thereafter reflected by an image mirror onto a screen for viewing by the user.

8 Claims, 6 Drawing Figures

X-RAY MICROFILM READER

BACKGROUND OF THE INVENTION

The present invention relates to a microfilm reader and in particular to an X-ray microfilm reader having diagnostic quality resolution for the reading of X-rays.

Many types of microfilm readers are known in the prior art as evidenced by the apparatus disclosed in U.S. Pat. Nos. 3,655,279, 3,836,242, 3,871,759, 3,961,846, 4,025,177 and 4,067,648.

The basic difference between an X-ray microfilm reader and other readers whose prime function is to display various forms of data or design committed to paper and microfilm, is that the paper readers are built to design objectives which are considerably different from those of a good X-ray reader. This is true primarily for the reason that the original document medium presents a totally different technical consideration for minification and faithful blowback and for the reason that the user needs in the case of paper are satisfied by simple legibility of the data presented. For X-rays, the need is far more sophisticated, since if the image is to have diagnostic value, its presentation must enhance characteristics subject to interpretation. The quality of the image depends on high resolution of detail which is not required for paper readers and controls by which the operator-viewer may vary the degree and placement of light and/or masking off of distracting areas, requirements which are not normally present in paper data microfilm readers. Even the exact dimensions of the microfilmed image, are critically important for an X-ray microfilm reader since radiologists must often diagnose changes in a patient's condition by comparing measurements to prior examinations. To be of value in this respect, the blowback image must be a precise dimensional duplicate of the original X-ray. There is no equivalent requirement for this in a paper microfilm reader.

SUMMARY OF THE INVENTION

It is therefore the main object of the present invention to provide an X-ray microfilm reader having a high resolution sufficient for the diagnostic quality resolution of X-rays.

Another object of the present invention is to provide a microfiche carrier design having no impediments to the free positioning of the X-ray on the carrier and providing a lens system which projects an image on the screen which is of the same quality as the original.

A further object of the present invention is to provide an X-ray microfilm reader which operates as a conventional light box for viewing full size originals without impairing the ability to project a microfilmed image of a prior study of the same examination, while the full-sized X-ray is on the view box. This enables the viewer to observe the changes to the patient's condition for diagnostic purposes.

An X-ray microfilm reader having the diagnostic quality resolution in accordance with the present invention is provided with a built-in ambient light shield which reduces reflective light on the screen, a variable high intensity light source, an anti-glare screen which in the preferred embodiment has a gray tint, projection lenses mounted in a rotating turret to provide magnifications of, for example, ten times, fourteen times, and twenty times, an optical system which provides increased brightness with reduced heat generation, a positive image positioning through a gear driven XY controlled fiche carrier which is 90° rotatable for properly imaging laterally filmed X-rays and which can accommodate any film or transparency, coner means for providing a variable image masking which in the preferred embodiment is from three and a half inches to full screen, a separate high intensity light and clip bar for making the reader into a viewer for full sized original X-rays.

BRIEF DESCRIPTION OF THE DRAWINGS

The present invention will now be described as follows with reference to the accompanying drawings wherein.

DETAILED DESCRIPTION OF THE INVENTION

Figure 1:
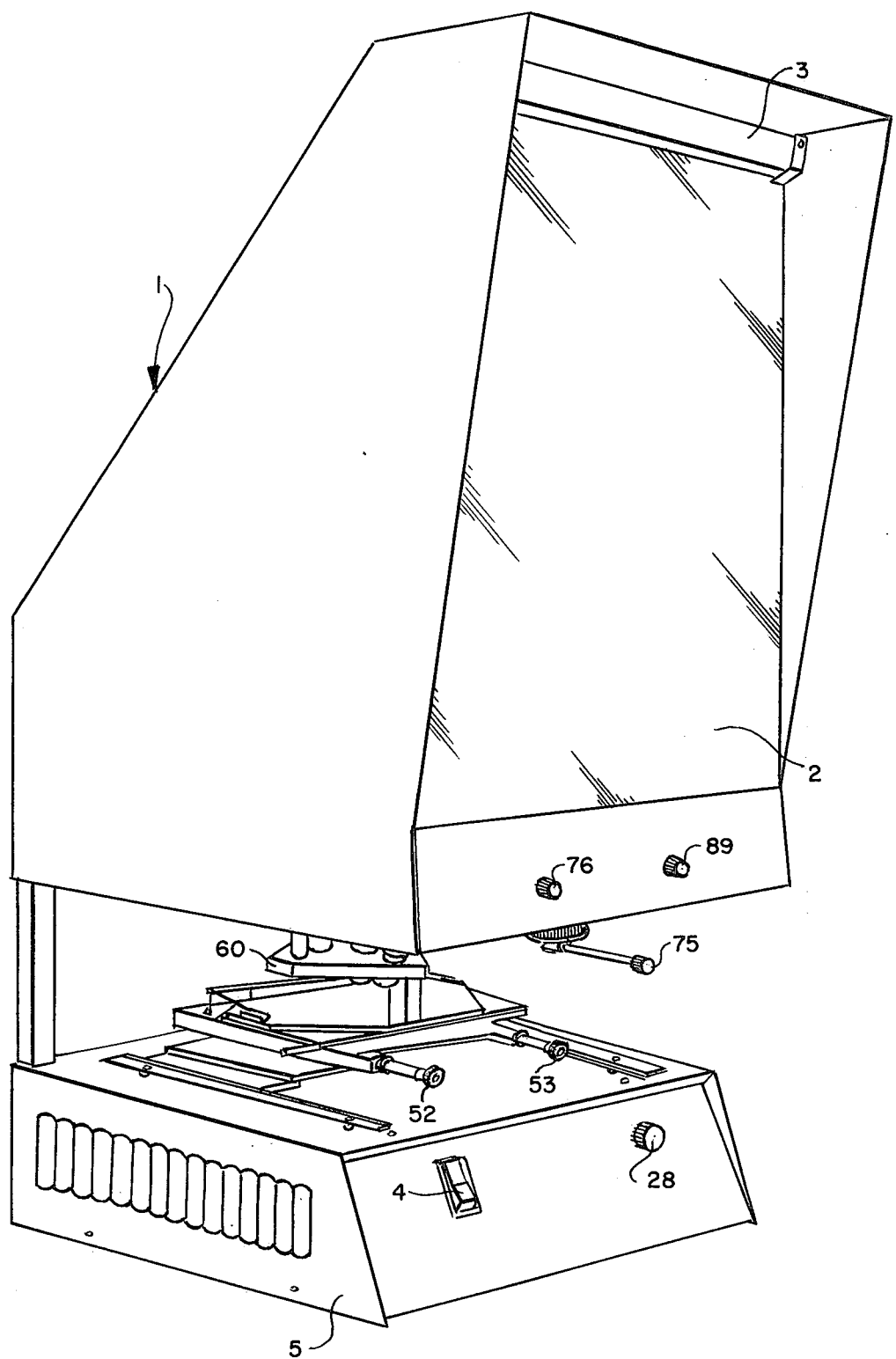
FIG. 1 is a perspective view of the X-ray microfilm reader according to the present invention.
Figure 4:
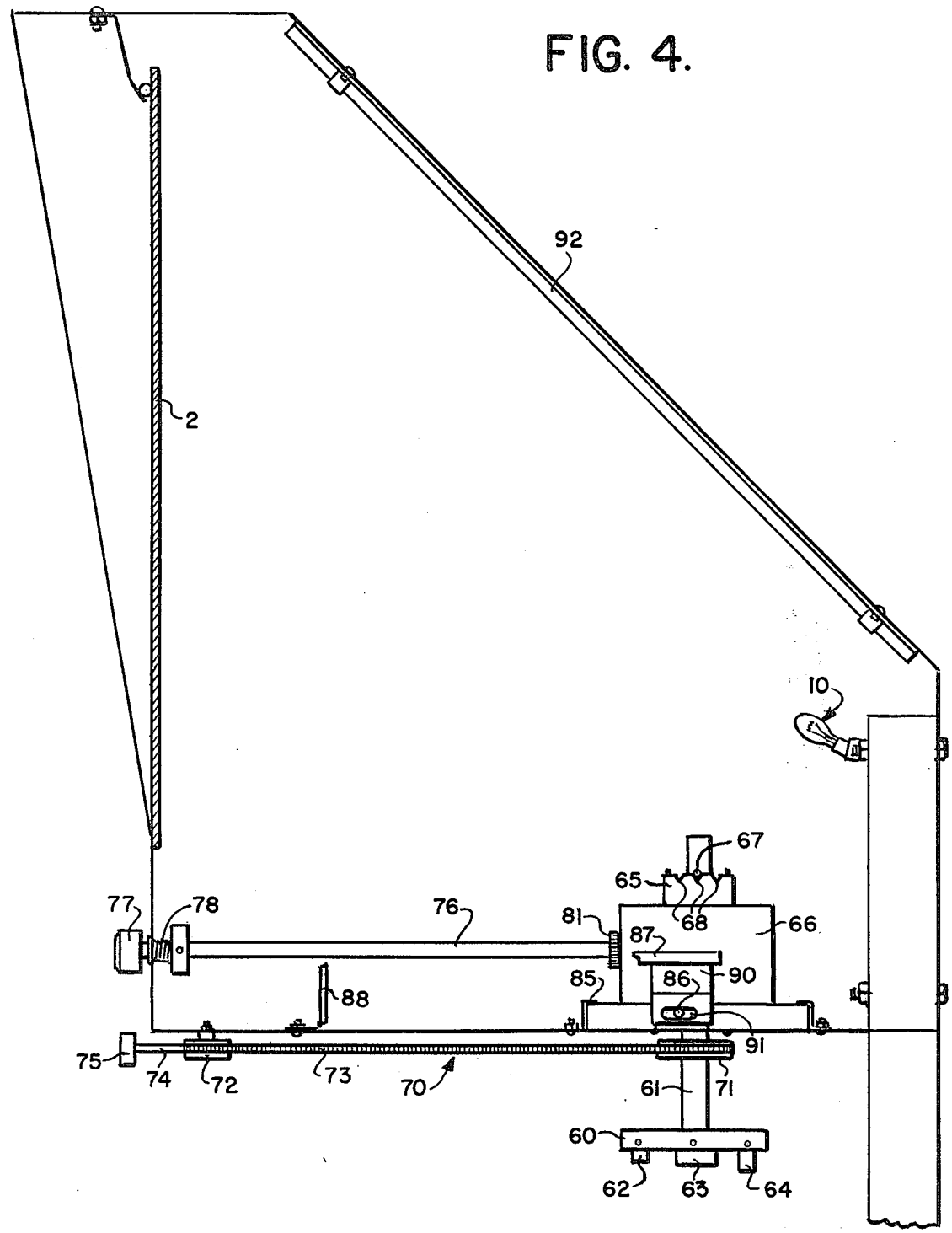
FIG. 4 is a side view of the inner mechanism of the top portion of the reader of FIG. 1.

Turning now to FIG. 1, the X-ray microfilm reader includes an upper housing 1 including an image screen 2 along with a clip bar 3. The clip bar 3 is disposed at the top of the screen 2 for holding full size X-rays against the external surface of the screen 2 and the screen is configured in size to accept such a full sized X-ray. In this manner, the X-ray microfilm reader can act as an X-ray reader if necessary. This embodiment is further carried out by the use of high intensity lamps 10 disposed inside the housing 1 as shown in FIG. 4 which are actuated in response to the switching on thereof by three-position switch 4 which alternatively turns on the microfilm reading light source, the high intensity bulbs 10 or neither of the two. The bulbs 10 are preferably 150 watt high intensity bulbs for effecting a clear viewing of the X-rays disposed on the exterior surface of the screen 2.

Figure 2:
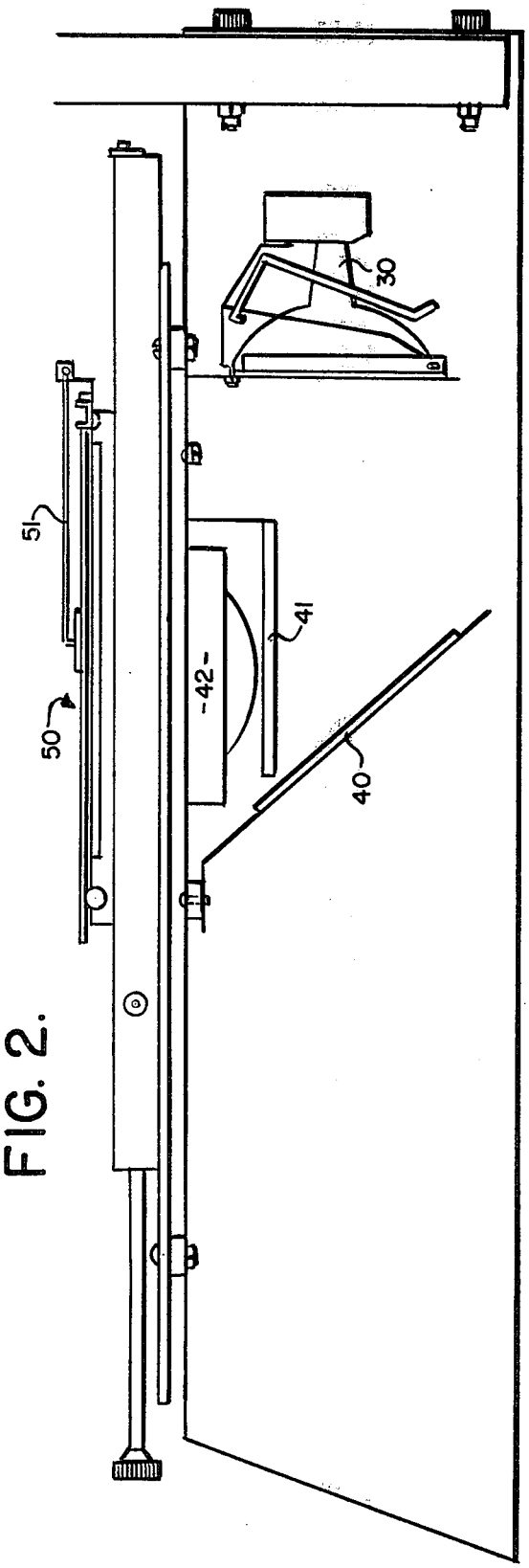
FIG. 2 is a sectional view through the bottom portion of the reader shown in FIG. 1.
Figure 3:
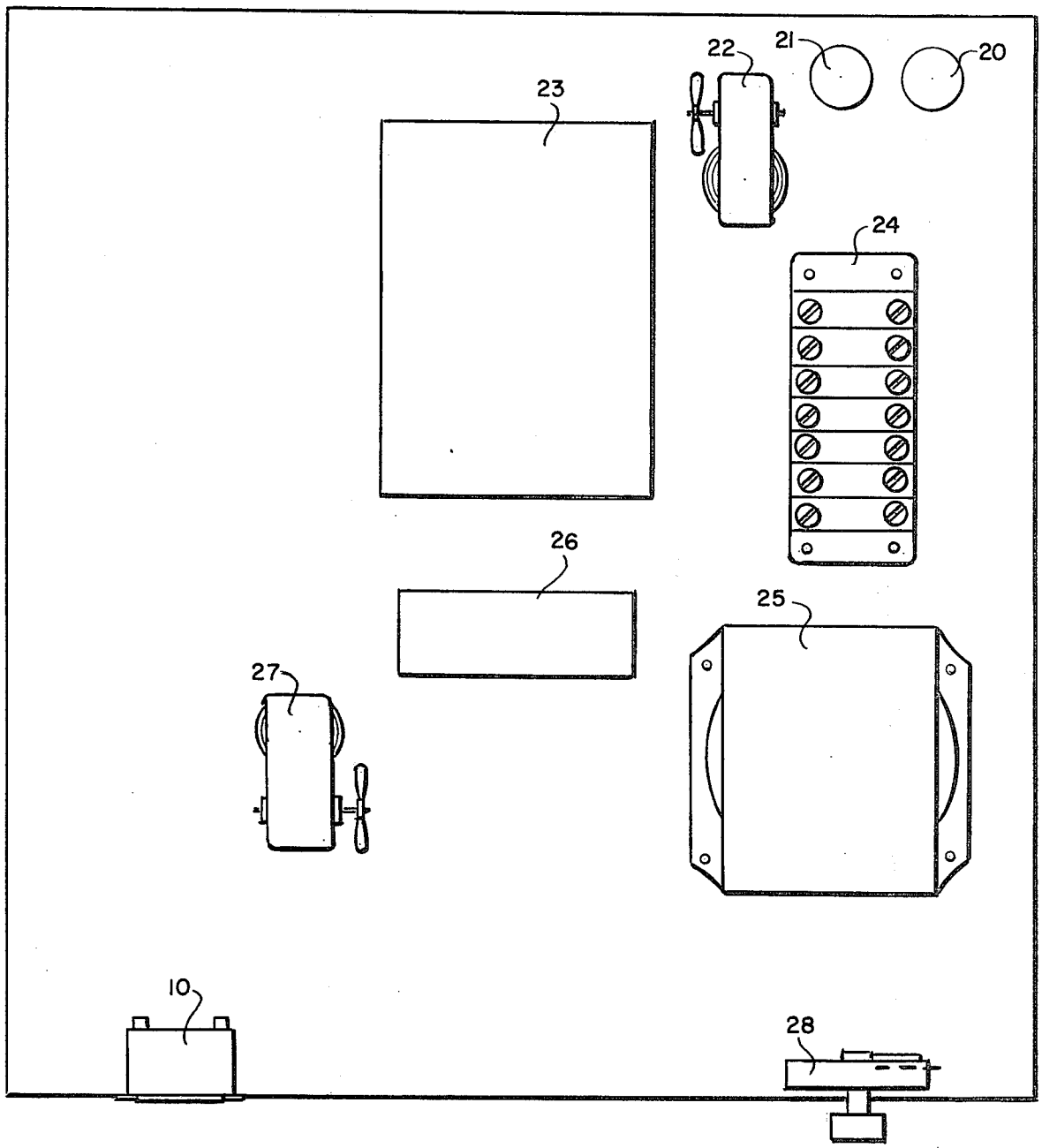
FIG. 3 is a bottom view of the viewer of FIG. 1.

The lower housing 5 of the X-ray microfilm reader contains, as shown in FIG. 3, the electrical compartment for the circuitry needed to operate the elements of the reader. As shown in FIG. 3, the electrical compartment includes the 110 volt line input 21, the fuse 20, a cooling fan 22 for blowing across the light source 30 (see FIG. 2), a bulb access panel 23 for enabling access of the light source 30, a transformer 25 for providing the various voltages necessary for operating the circuitry of the reader, a terminal block 24 to which the various elements are connected, mirror adjustment access hold 26 for enabling access to the dichroic mirror 40 (see FIG. 2), a cooling fan 27 for blowing cool air across the dichroic mirror 40, the three-position switch 10, and a four-position rotary switch 28 for brightness control which is connected to the light source 30.

With reference to FIG. 2, the remainder of the apparatus provided in the lower housing 5 comprises the light source 30 which is preferably a 300 watt ELH bulb and which provides light onto a dichroic mirror 40 which passes infrared light and reflects visible light. The light from the source 30 which is reflected by the dichroic mirror 40 passes through heat absoring glass 41 to condenser lense 42 and through the fiche carrier 50 which holds the microfilm medium which has the image thereon which is to be displayed on screen 2.

The fiche carrier is designed to be rotatable at 90° to the position shown and also includes spring clips 51 for applying positive pressure to reduce the Newton rings on the screen. Adjusting arm 52 of the fiche carrier enables horizontal adjustment thereof, while arm 53 enables vertical adjustment thereof in a conventional manner as known in the prior art.

Also provided in the upper housing 1 of the X-ray microfilm reader are means for selecting one of a plurality of different projecting lenses, focusing means and coner means for masking out portions of the image displayed on the screen 2. All of these means will now be discussed with respect to FIGS. 1, 4 and 5.

Figure 5:
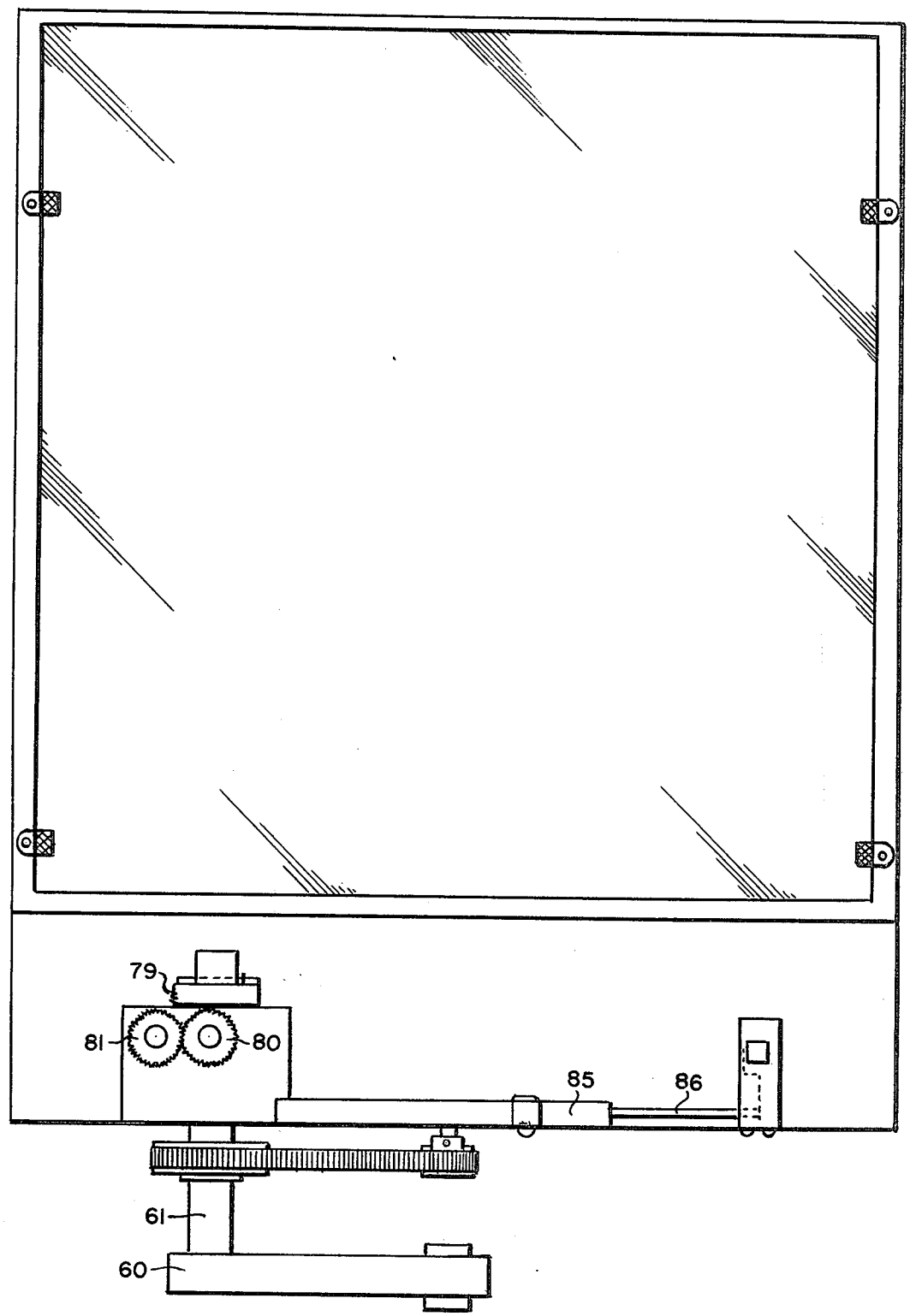
FIG. 5 is a front view of the elements inside the reader of FIG. 1.

The means for selecting a projection lens comprises lens turret 60 having, in the embodiment shown in FIGS. 1, 4 and 5, three projection lenses, which in this case provides for 10×, 14× and 20× magnification, but which can have any selected magnification for the particular embodiment utilized. The turret is in the shape of a sector of a circle and is rotatably mounted on a shaft 61 which corresponds to the center of that circle and where the lenses 62, 63 and 64 are disposed with their centers at the same radius from the center of shaft 61. The centers of the lenses 62–64 are aligned with the beam condensed in condenser 42 to provide for proper imaging.

The shaft 61 is rotatably mounted in a hollow cylindrical member 65 which in turn is mounted in a focusing block 66, as will be explained hereinafter. Connected to the upper end of rod 61 are pins 67 which are diametrically opposite end other and which engage in indentations 68 disposed in the top surface of hollow cylindrical member 65. The indentations 68 correspond to the positioning of the lenses 62–64 in the proper working position over the microfilm medium and in alignment with the beam from the condenser 42.

In order to effect rotation and thus selection of the desired lens 62–64, a gear system 70 is provided. The gear system 70 includes gear wheel 71 fixed to the shaft 61 and rotatable therewith, gear wheel 72 which is rotatably mounted onto the housing 1 and in alignment with gear wheel 71 and gear belt 73 which operatively connects the two gears 71 and 72.

Connected to the gear wheel 72 is lens selector rod 74 having knob 75 thereon and the rod 74 is pivotable about the rotational axis of gear wheel 72 to effect rotation of gear wheel 71 and thus shaft 61 and turret 60 so that the desired lens 62–64 can be positioned in place.

In order to effect a proper focusing of the selected lens, focusing means are provided. The focusing means includes a rack gear disposed on the external surface of hollow cylindrical member 65, along with a gear wheel rotatably mounted in focusing block 66 which is engaged therewith to effect movement along the longitudinal axis of the shaft 61 is response to rotational movement of the gear by focusing rod 76 which is operatively connected thereto. The rod 76 has a knob 77 connected thereto externally of the housing 1 effecting the rotation thereof for focusing. The rod 76 is also spring loaded with spring 78 to act against drift in the focusing during use. In FIG. 5, rack gear 79 is shown with the internally mounted gear not shown but driven by gear 80 which is in turn driven by gear 81 connected to rod 76.

The coner means comprises an iris mechanism 85 having a pin 86 extending therefrom which operatively controls the opening and closing of the iris 85. The iris mechanism 85 is situated immediately adjoining the focusing block 66. The iris mechanism is controlled by a coner adjusting rod 87 which has, in the preferred embodiment, a square cross section to prevent the rotation thereof and which is slidably mounted on support 88 and also on the housing wall and terminates with a knob 89 external of the housing 1 which can be pulled and pushed to effect the degree of coning that is desired. The coner rod 87 has a bracket 90 connected to the inner end thereof with a slot 91 therein which engages the arm 86 to open and close the iris in response to the sliding movement of the corner rod 87.

After the image is focused through the desired lens 62–64 and is passed through the coner means, it is reflected by mirror 92 onto the screen 2 so that it can be viewed.

Figure 6:
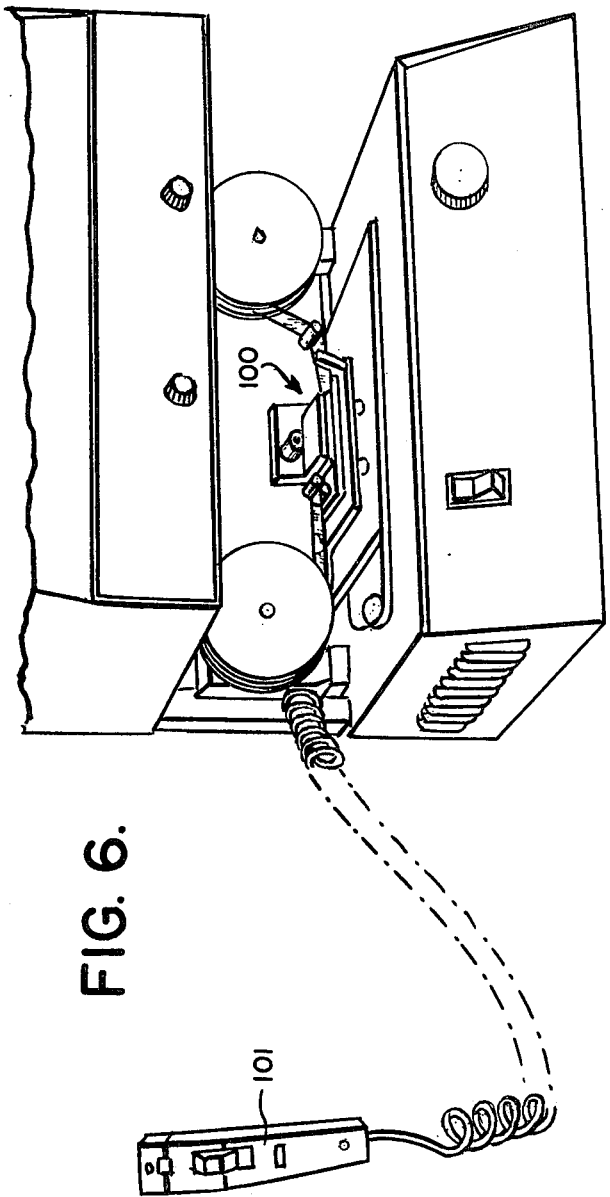
FIG. 6 is a partial perspective view of an alternative embodiment of the reader of FIG. 1.

In an alternative embodiment shown in FIG. 6, the microfiche holder 50 is replaced by a reel to reel microfilm roll holder 100 which can be remotely controlled via a remote control device 101. Each frame on the microfilm roll is brought into the working position above the condensed light beam and projected on the screen in the manner set forth in the foregoing explanation.

What is claimed is:

1. An X-ray microfilm reader comprising:
    means receptive of the microfilm medium for holding same in a working position;
    a light source disposed below the working position;
    a dichroic mirror receptive of the light from the light source for reflecting same towards the microfilm medium in the working position;
    condensor means receptive of the reflected light from the mirror for condensing same prior to passage through the microfilm medium in the working position;
    a screen;
    optical means disposed above the working position and receptive of the condensed light passing through the microfilm medium for effecting the display of the image carried therewith on the screen, wherein the optical means comprises a lens turret having a plurality of projection lenses thereon, means mounting the lens turret for rotation to successively position each of the lenses over the working position of the microfilm medium comprising a hollow cylindrical member, a shaft rotatably received in the hollow member and fixed to the turret, a first gear wheel on the shaft, a second rotatably mounted gear wheel spaced from the first gear wheel and having a rod connected thereto for selectively manually rotating the second gear wheel, a gear belt connecting the two gear wheels to impart rotation to the turret in response to movement of the rod, detents on the top end of the hollow cylindrical member and projecting pins at the top end of the shaft engageable with the detents to define operational positions for each projection lens and means for focusing the selected projection lens comprising a rack gear along the longitudinal length of the hollow cylindrical member, a focusing block having a third gear wheel and slidably receptive of the hollow cylindrical member therein for vertical movement with the third gear wheel in engagement with the rack gear and a manually rotatable focusing rod connected to the third gear wheel and rotatable therewith to effect focusing the projection lenses; and an image mirror disposed above the optical means for receiving the image passing through the optical means for reflecting same onto the screen.

2. The reader according to claim 1, wherein the condensor means comprises a condensor lens and heat absorbing glass disposed between the lens and the dichroic mirror.

3. The reader according to claim 1, wherein the lens turret comprises a member having the configuration of a sector of a circle with the shaft connected at the circle center and the plurality of lenses disposed with their centers at the same radius.

4. The reader according to claim 3, wherein the optical means further comprises an adjustable iris disposed between the projecting lenses and the image mirror and coner means for adjusting the iris.

5. The reader according to claim 4, wherein the coner means comprises an iris control member projecting from the iris and a longitudinally slidably mounted coner rod having an end portion engageable with the control member for adjusting the iris in response to sliding movement of the coner rod.

6. The reader according to claim 1, wherein the microfilm holding means comprises a microfiche carrier including a base plate, spring means for applying pressure on the microfiche towards the base plate and means mounting the base plate and spring means for rotation of 90° with respect to the projecting lens.

7. The reader according to claim 1, wherein the microfilm holding means comprises a reel to reel mechanism for a roll of microfilm.

8. The reader according to claim 1, further comprising a high intensity light source behind the screen and means for releasably holding full size X-ray negatives on the screen for illumination by the high intensity light.

* * * * *